(12) United States Patent
Dandachli

(10) Patent No.: US 12,203,409 B2
(45) Date of Patent: Jan. 21, 2025

(54) SYSTEMS AND METHODS ASSOCIATED WITH A REMOVABLE INLET SHIELD

(71) Applicant: PTP Turbo Solutions, LLC, Austin, TX (US)

(72) Inventor: Joe Dandachli, Austin, TX (US)

(73) Assignee: PTP Turbo Solutions, LLC, Austin, TX (US)

( * ) Notice: Subject to any disclaimer, the term of this patent is extended or adjusted under 35 U.S.C. 154(b) by 348 days.

(21) Appl. No.: 17/682,830

(22) Filed: Feb. 28, 2022

(65) Prior Publication Data

US 2022/0389859 A1 Dec. 8, 2022

Related U.S. Application Data

(63) Continuation of application No. PCT/US2021/035584, filed on Jun. 3, 2021.

(51) Int. Cl.
| | |
|---|---|
| *F02C 7/055* | (2006.01) |
| *F01D 25/24* | (2006.01) |
| *F02B 35/02* | (2006.01) |
| *F02B 37/24* | (2006.01) |
| *F02B 39/16* | (2006.01) |
| *F02M 35/02* | (2006.01) |

(52) U.S. Cl.
CPC ............ *F02B 39/16* (2013.01); *F02B 37/24* (2013.01); *F02M 35/02* (2013.01); *F02M 35/0204* (2013.01); *F01D 25/24* (2013.01); *F05D 2240/14* (2013.01); *F05D 2260/32* (2013.01)

(58) Field of Classification Search
CPC .... F02M 35/02; F02M 35/0204; F02C 7/055; F05D 2240/14; F05D 2260/32; F05D 2260/39; F05D 2260/607; F05D 2220/40
USPC ... 55/306, 385.1, 385.3, 490, 491, 432, 525; 60/311
See application file for complete search history.

(56) References Cited

U.S. PATENT DOCUMENTS

| | | | |
|---|---|---|---|
| 3,286,459 A | 11/1966 | Ephram, Jr. | |
| 4,076,508 A * | 2/1978 | Christensen | ........... B01D 50/00 55/432 |
| 4,821,520 A * | 4/1989 | Rumfield | ................ F02B 37/02 55/525 |
| 6,138,950 A * | 10/2000 | Wainfan | ................. B64D 33/02 55/306 |
| 8,763,382 B2 * | 7/2014 | Champoux | ............. F02C 7/055 55/525 |
| 10,047,305 B2 * | 8/2018 | Aubry | .................... C10G 47/18 |
| 10,823,063 B2 * | 11/2020 | Wunsch | .................. F02C 7/055 |
| 10,858,995 B2 * | 12/2020 | Aubert | ...................... F02C 7/055 |
| 11,047,305 B2 * | 6/2021 | Fraser-Beekman | .... B64D 33/02 |
| 11,117,677 B2 * | 9/2021 | Boyce | ................ G01N 15/0826 |
| 11,591,961 B1 * | 2/2023 | Strickland | ............... F02C 7/055 |
| 2006/0005516 A1 * | 1/2006 | Pikesh | .................. B01D 46/76 55/467 |
| 2010/0043761 A1 | 2/2010 | Joergl et al. | |

(Continued)

*Primary Examiner* — Minh Chau T Pham
(74) *Attorney, Agent, or Firm* — Pierson IP, PLLC

(57) ABSTRACT

An inlet shield with a first portion that is configured to be secured to an inlet of a turbocharger, and a second portion that is configured to be removably coupled to the first portion via magnets, wherein different second portions may have different mesh layouts allowing a consumer to choose different levels of protection and air flow based on desired use.

14 Claims, 9 Drawing Sheets

(56) References Cited

U.S. PATENT DOCUMENTS

2012/0090300 A1* 4/2012 Champoux ............. F02C 7/055
                                                        60/311
2015/0375152 A1* 12/2015 Simmons ............... F16M 13/02
                                                        55/491

* cited by examiner

120

120

SYSTEMS AND METHODS ASSOCIATED WITH A REMOVABLE INLET SHIELD

BACKGROUND INFORMATION

Field of the Disclosure

Examples of the present disclosure are related to a removable inlet shield for turbocharger. More specifically, embodiments utilize an inlet shield with a first portion that is configured to be secured to an inlet of a turbocharger, and a second portion that is configured to be removably coupled to the first portion via magnets, wherein different second portions may have different mesh layouts allowing a consumer to choose different levels of protection and air flow based on desired use.

Background

Turbochargers are turbine-driven, force induction devices that increase an internal combustion engine's power output by forcing extra compressed air into the combustion chamber. This improves an engine's power output because the compressor can force more air, and proportionately more fuel, into the combustion chamber than atmospheric pressure alone. Generally to compress the air, turbochargers have an air inlet, compressor, and outlet to the engine, where the amount of air that can be compressed is based on part on the amount of air that can be received by the air inlet.

However, the air inlet of a turbocharger is required to be covered to limit debris, objects, and other elements from entering the turbocharger. This creates mutually conflicting or dependent conditions where the amount of protection to the air inlet minimizes the amount of air that the inlet of the turbo charger can receive. Conventionally, to cover an air inlet of a turbocharger, an inlet shield is semi permanently clamped onto the air inlet. When a consumer desires to change the inlet shield, the clamp is required to be removed and an entirely new inlet shield must be clamped to the air intake. This process of removing and reinstalling a new inlet shield can be time consuming, expensive, and lead to unsafe conditions if the inlet shield is not clamped correctly.

Accordingly, needs exists for more efficient and effective systems for a two piece inlet shield, wherein a first portion is configured to be clamped around a circumference of an inlet shield, and a second portion is configured to be coupled with the first portion via magnets, wherein forces coupling the first portion and the second portion extend in a plane in parallel to a center of the air inlet.

SUMMARY

Embodiments disclosed herein describe systems and methods for a removable inlet shield. The inlet shield may have a first portion and a second portion.

The first portion may be configured to be coupled to the air intake of a turbocharger via a clamp. The first portion may have an inner circumference that is configured to position adjacent to an outer circumference of the air intake. In embodiments, a front face of the first portion may be co-planar with a front face of the air intake.

The second portion that is configured to be coupled to the first portion via magnets, and anti-rotation castling or splines. Different second portions may have different screen patterns, wherein the different screen patterns may occupy more or less space based on desired use. The amount of air that can cross the second portions may be directly related to the surface area occupied by the surface areas associated with the screen patterns. For example, a first screen pattern may occupy a first surface area across a face of the second portion, and a second screen pattern may occupy a second surface area across the face of the second portion. Accordingly, the first screen pattern may occupy less surface area and may be used in situations where it is desired to optimize performance, and the second screen pattern may occupy more surface area and may be used in situations where guarding the turbocharger is desired.

In embodiments, a front face of the second portion may be offset from the front face of the air intake, and the inner diameter of the second portion may not be aligned with the outer diameter of the air intake. This may create a distance between the turbocharger and the second portion, allowing the second portion to be cooler than and not as hot as surfaces associated with the turbocharger. The differences in temperatures may allow the second portion to be more easily interchanged than removing components that directly contact or overlap with the turbocharger.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
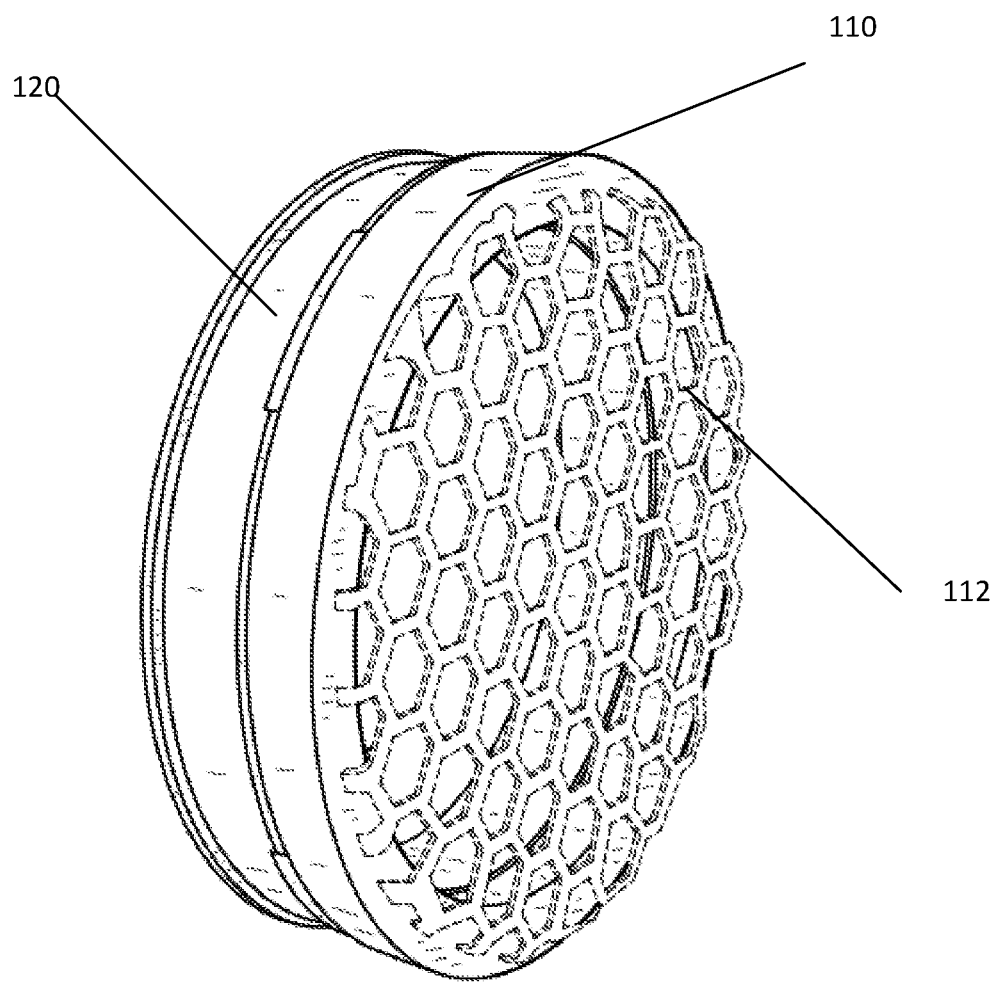
FIG. 1 depicts an intake shield system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

FIG. 1 depicts an inlet shield system 100, according to an embodiment. Inlet shield system 100 may be configured to allow a user to selectively change the amount of air a turbocharger can receive based on a surface area occupied by a mesh covering of inlet shield system 100. Inlet shield system 100 may include a detachable shield 110 and clamping cylinder 120.

Detachable shield 110 may be configured to be removably coupled with clamping cylinder via castling or splines, as well as via magnets, wherein first magnets with a first polarity may be positioned on an inner face of detachable shield 110. Detachable shield 110 may be a hollow cylinder with a first inner diameter and may include a guard 112. The first inner diameter associated with detachable shield may be slightly larger than the inner diameter associated with the outer circumference of an air intake of a turbocharger. Guard 112 is formed of a mesh, lattice, webbed pattern, etc. that allows air to selectively flow through guard 112. In embodiments, a first detachable shield 110 may have a guard 112 with a first pattern that occupies a first surface area and a second detachable shield 110 may have a guard 112 with a second pattern that occupies a second surface area, wherein the first surface area and the second surface area have different amounts. Based on the amount of surface area occupied by guard 112 more or less air may enter into an intake of a turbocharger, which may limit or increase the performance of the turbocharger.

Clamping cylinder 120 may be a hollow cylinder that has an inner circumference that is configured to be positioned adjacent to an outer circumference of the air intake of the turbocharger. Clamping cylinder 120 may include a clamp and second magnets. The clamp may be configured to apply radial forces against the outer circumference of the air intake of the turbocharger, wherein the clamp is configured to secure the clamping cylinder 120 and the air intake. An inner circumference of clamping cylinder 120 may have the first inner diameter. The second magnets may be positioned on an outer face of clamping cylinder 120, and may have a second polarity. The second magnets associated with the clamping cylinder 120 may create forces with the first magnets associated with detachable shield 110 to couple clamping cylinder 120 and detachable shield 110 together. In embodiments, detachable shield 110 may be coupled to clamping cylinder 120 based on forces that are perpendicular to the radial forces created by the clamp of clamping cylinder 120 against the outer diameter of the air intake. This may allow air intake system 100 to be removed from the inlet of the turbocharger by applying forces in different directions if desired. In embodiments, In embodiments, while clamping cylinder 120 is coupled with the air intake of the turbocharger, different detachable shields 110 may be coupled with clamping cylinder 120 without removing clamping cylinder 120 from the air intake of the turbocharger. This may enable quick and efficient interchanges of detachable shields with different air flow properties and safety guards based on a desired need.

Figure 2:
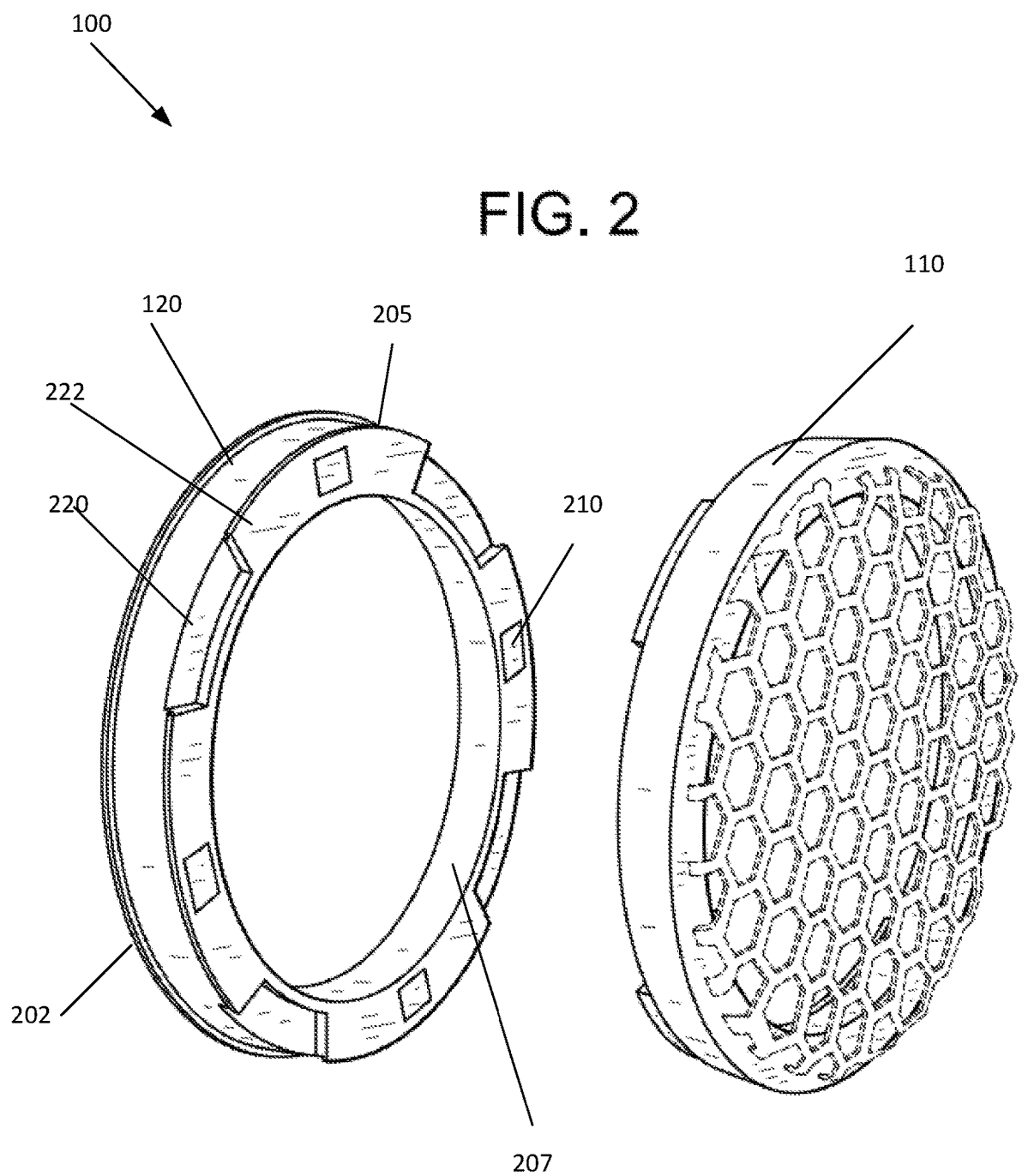
FIG. 2 depicts an intake shield system, according to an embodiment.

FIG. 2 depicts an outer face 205 of clamping cylinder 120 and an outer face of detachable shield 110, according to an embodiment. Elements depicted in FIG. 2 may be described above, and for the sake of brevity a further description of these elements may be omitted.

Outer face 205 of clamping cylinder 120 may be configured to be co-planar or in front of an opening associated with the air intake of a turbocharger, while inner circumference 207 of clamping cylinder 120 may be positioned directly around an outer circumference of the air intake of the turbocharger. An inner face 202 of clamping cylinder 120 may be positioned around the outer circumference of the air intake of the turbocharger. By having outer face 205 positioned away from the opening of the air intake of the turbocharger, heat may not be transferred as quickly to detachable shield 110. Outer face 205 may include first castling depressions 220 and projections 222, and first magnets 210.

First castling depressions 220 and projections 222 may be positioned alternating pattern around outer face 205 to create a changing profile. First castling depressions 220 may be configured to be aligned with second castling projections 420 on an inner face 405 of detachable shield 110, and first castling projections 220 may be configured to be aligned with second castling depressions 422 on inner face of detachable shield 110. Responsive to interfacing first castling depressions 220 and projections 222 with second castling projections 420 and depressions 422, detachable shield 110 may not rotate relative to clamping cylinder 120. One skilled in the art may appreciated that other mechanical devices to form an anti-rotation lock between detachable shield 110 and clamping cylinder 120 may be used, such as splines.

In embodiments, first depressions 220 may have a groove extending from an outer circumference of clamping cylinder 120 towards that inner circumference 207 of clamping cylinder 120. The positioning of first depressions 220 on the outer circumference of clamping cylinder 120 may limit heat transfer between clamping cylinder 120 and detachable shield 110, while air is flowing through inner circumference 207.

First magnets 210 may be magnets of a first polarity, which may be positioned on first castling projections 222. First magnets 210 may be configured to be coupled with second magnets 410 positioned on an inner face of detachable shield 110, wherein the forces created by first magnets 210 and second magnets 410 may be substantially in parallel to a flow of air through inlet shield system 100. Further, the forces created by first magnets 210 and second magnets 410 may be orthogonal to the radial forces created by a clamp associated with clamping cylinder 120 against the outer circumference of the air intake of the turbocharger. This may allow the forces created by the magnets 210, 410 to be assisted with a force created by the air flowing into the air intake in a first direction.

Figure 3:
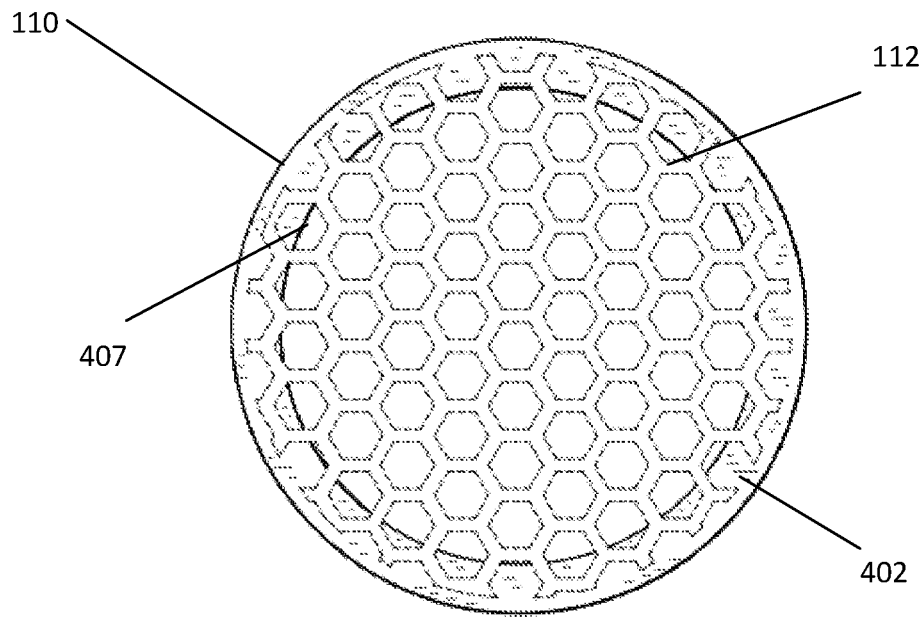
FIGS. 3-6 depict a first portion of an intake shield system, according to an embodiment.
Figure 4:
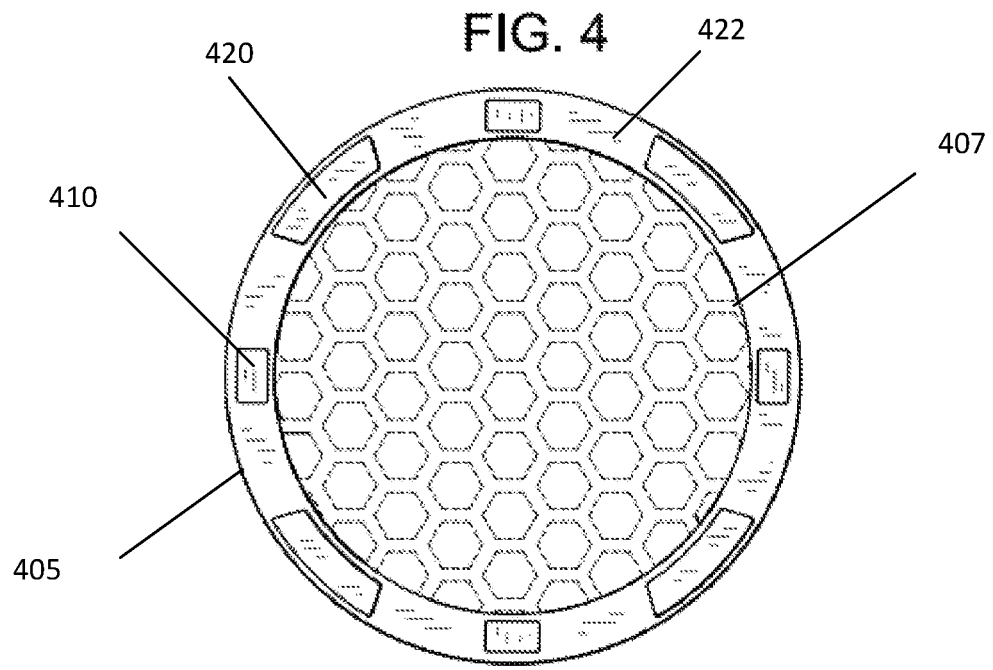

FIG. 3 depicts an outer face 402 of detachable shield 110, and FIG. 4 depicts an inner face 405 of detachable shield 110. Elements depicted in FIGS. 3 and 4 may be described above, and for the sake of brevity a further description of these elements may be omitted.

As depicted in FIG. 3, guard 112 may be configured to cover an entirety of a passageway through detachable shield 110. This may restrict or limit objects from passing through detachable shield 110. In embodiments, different detachable shields 110 may have different patterns formed by guards 112, which may occupy more or less space, wherein the performance of the turbocharger may be directly related to the space occupied by guards 112. This may be due to guards 112 reducing a surface area and flow rate of air into the turbocharger.

As depicted in FIG. 4, inner face 405 of detachable shield 110 may include second castling projections 420 and depressions 422, which may be positioned alternating pattern around to create a changing profile. This may allow second castling projections 420 and depressions 422 to be interfaces with first castling depressions 420 and projections 422 to form an anti-rotation lock. In further embodiments, the inner face 405 of detachable shield 410 may be coated with or include an insulating layer, which may limit the heat transfer from clamping cylinder 120 to detachable shield 110.

Second magnets 420 may be magnets of a second polarity, which may be positioned on second castling depressions 422.

Figure 5:
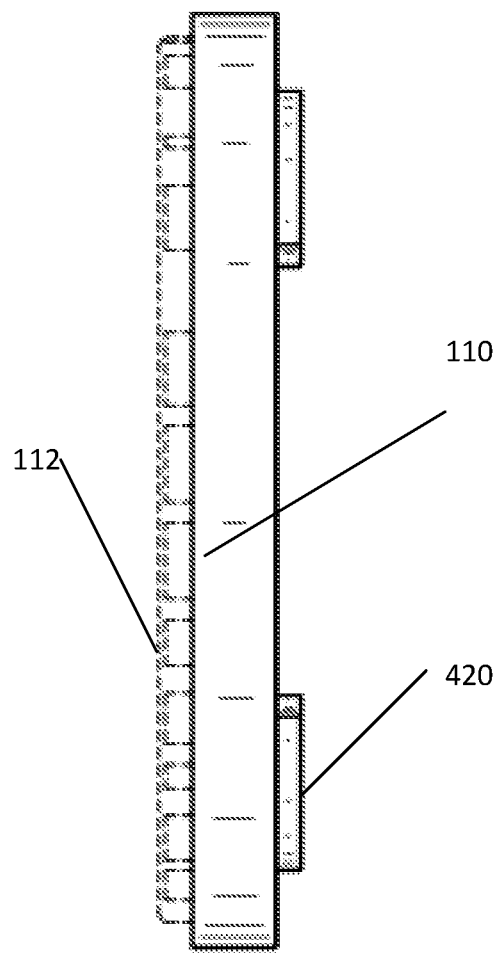
Figure 6:
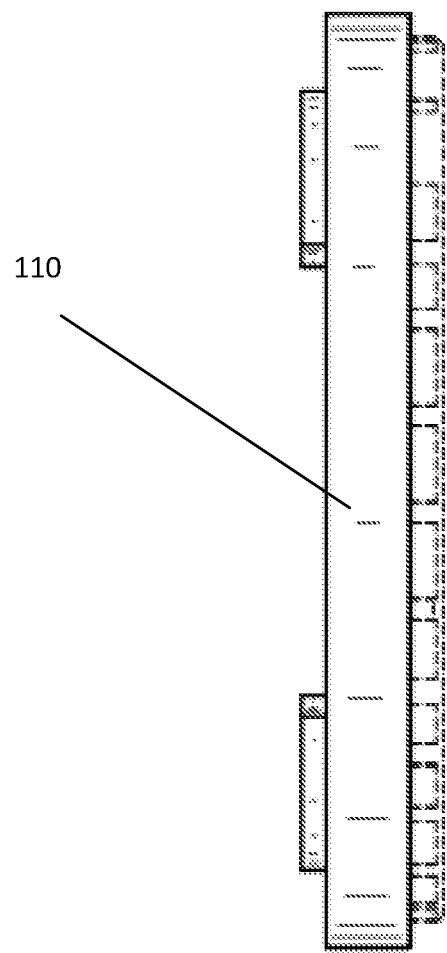

FIGS. 5 and 6 depict side views of detachable shield 110, according to an embodiment. Elements depicted in FIGS. 5 and 6 may be described above, and for the sake of brevity a further description of these elements may be omitted.

Figure 7:
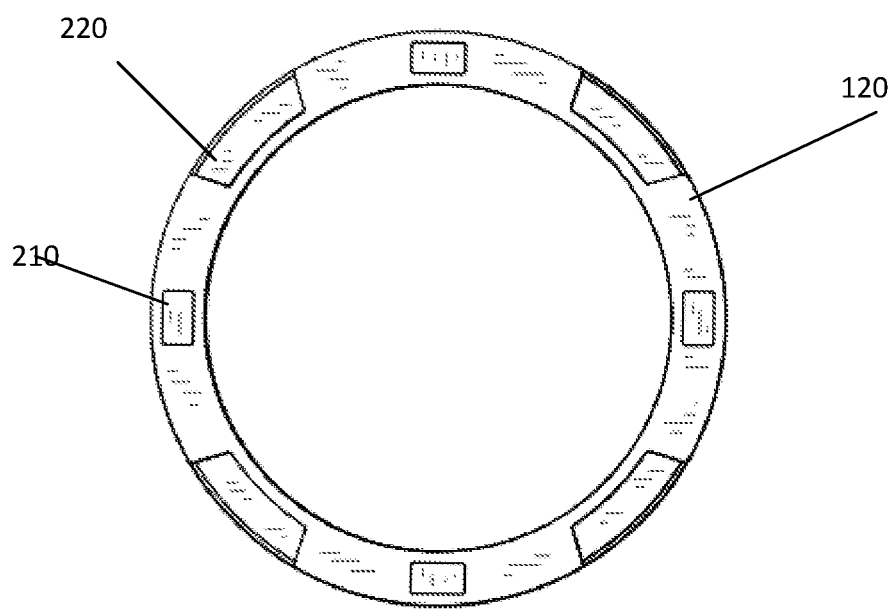
FIGS. 7-10 depict a second portion of an intake shield system, according to an embodiment.
Figure 8:
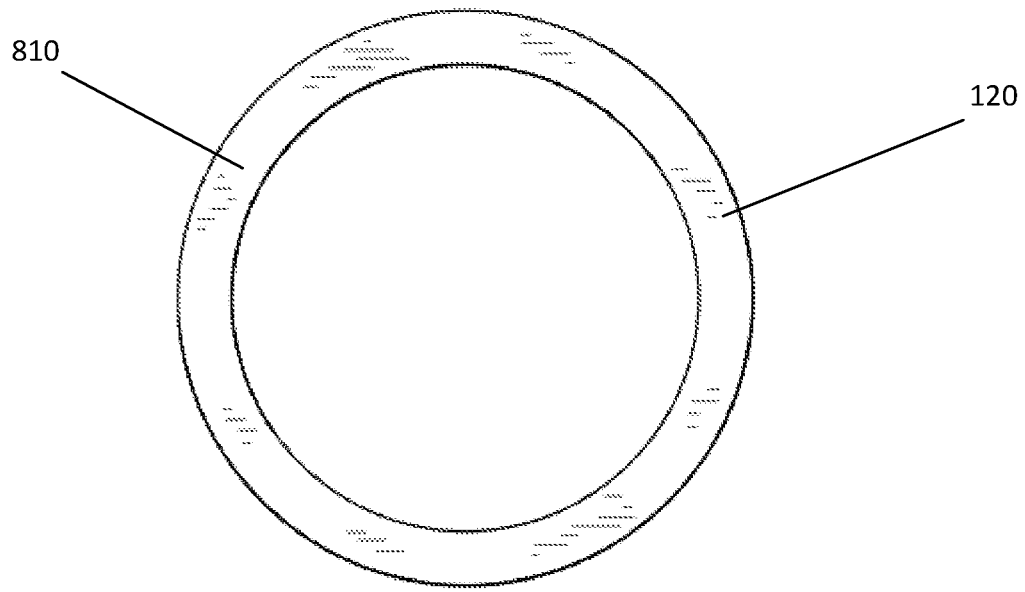

FIG. 7 depicts a front view of outer face 205 of clamping cylinder 120, and FIG. 8 depicts a front view of an inner face 810 of claiming cylinder 120. Elements depicted in FIGS. 7 and 8 may be described above, and for the sake of brevity a further description of these elements may be omitted. As depicted in FIGS. 7 and 8, a hollow passageway may be formed through clamping cylinder 120. This may allow air to pass through clamping cylinder 120.

Figure 9:
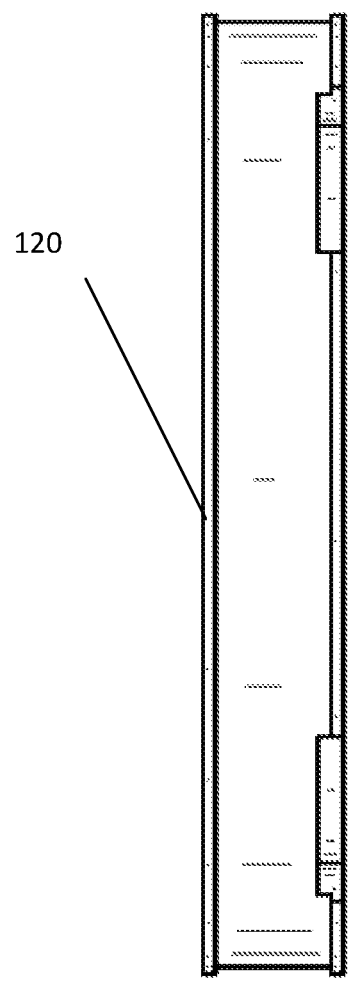
Figure 10:
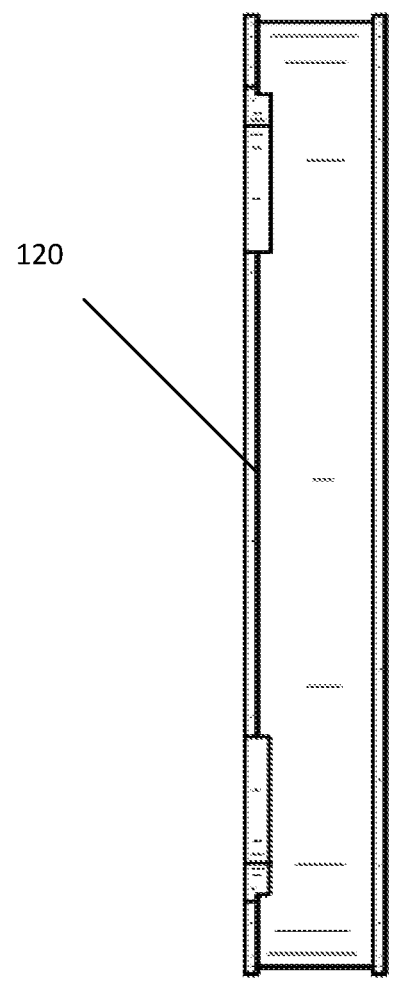

FIGS. 9 and 10 depict side views of clamping cylinder 120, according to an embodiment. Elements depicted in FIGS. 5 and 6 may be described above, and for the sake of brevity a further description of these elements may be omitted.

Figure 11:
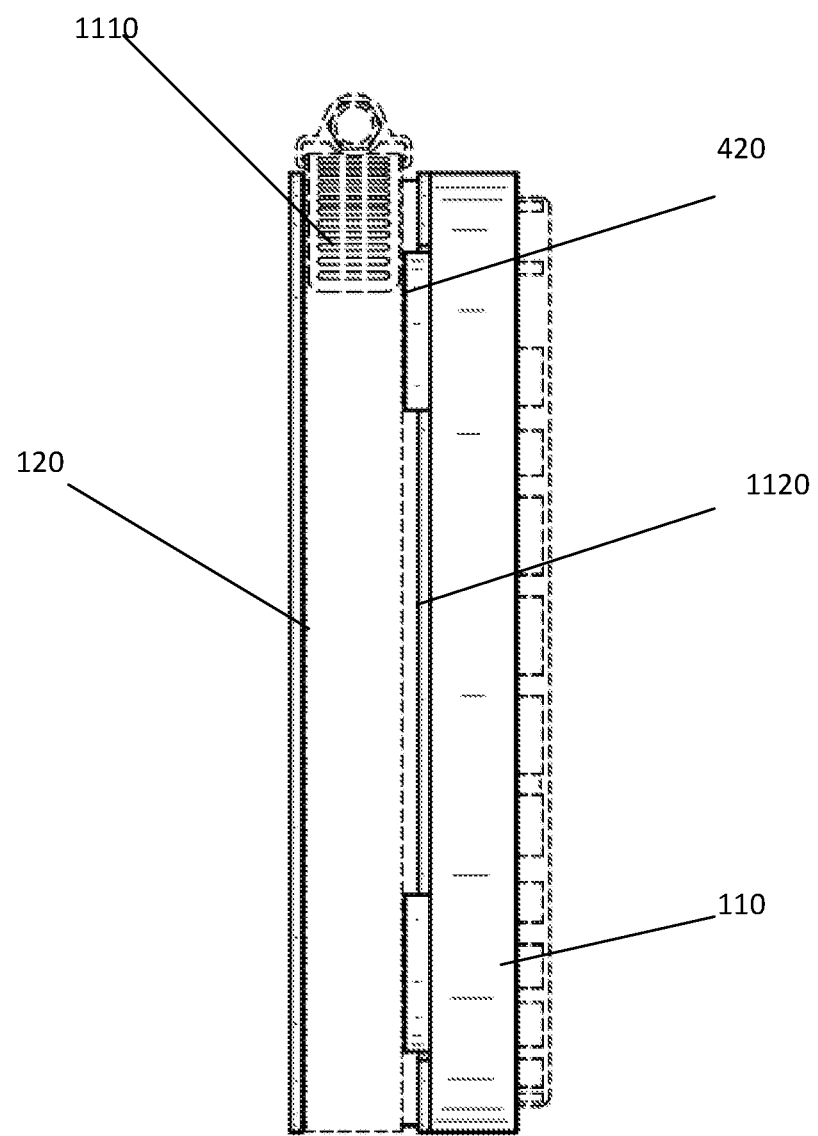
FIG. 11 depicts an intake shield system, according to an embodiment.

FIG. 11 depicts an embodiment of clamping cylinder 120 and detachable shield 110 being coupled together via their respective magnets, according to an embodiment. Elements depicted in FIG. 11 may be described above, and for the sake of brevity a further description of these elements may be omitted.

As depicted in FIG. 11, the outer face of clamping cylinder 120 may be positioned directly adjacent to and contacting the inner face of detachable shield 110. This may create a unified piece along joint outer circumference 1120 that allows air to travel through a hollow cylinder formed between the two components.

Furthermore, FIG. 11 depicts clamp 1110. Clamp 1110 may be configured to form a radial force against the outer circumference of the air intake of the turbocharger. Clamp 1110 may be aligned with the outer circumference of clamping cylinder 120, and may not overlap with the outer surface of detachable shield 110. This may allow detachable shield 110 to be quickly and efficiently removed from clamping cylinder 120 while clamping cylinder 120 remains coupled to the air intake of the turbocharger.

Figure 12:
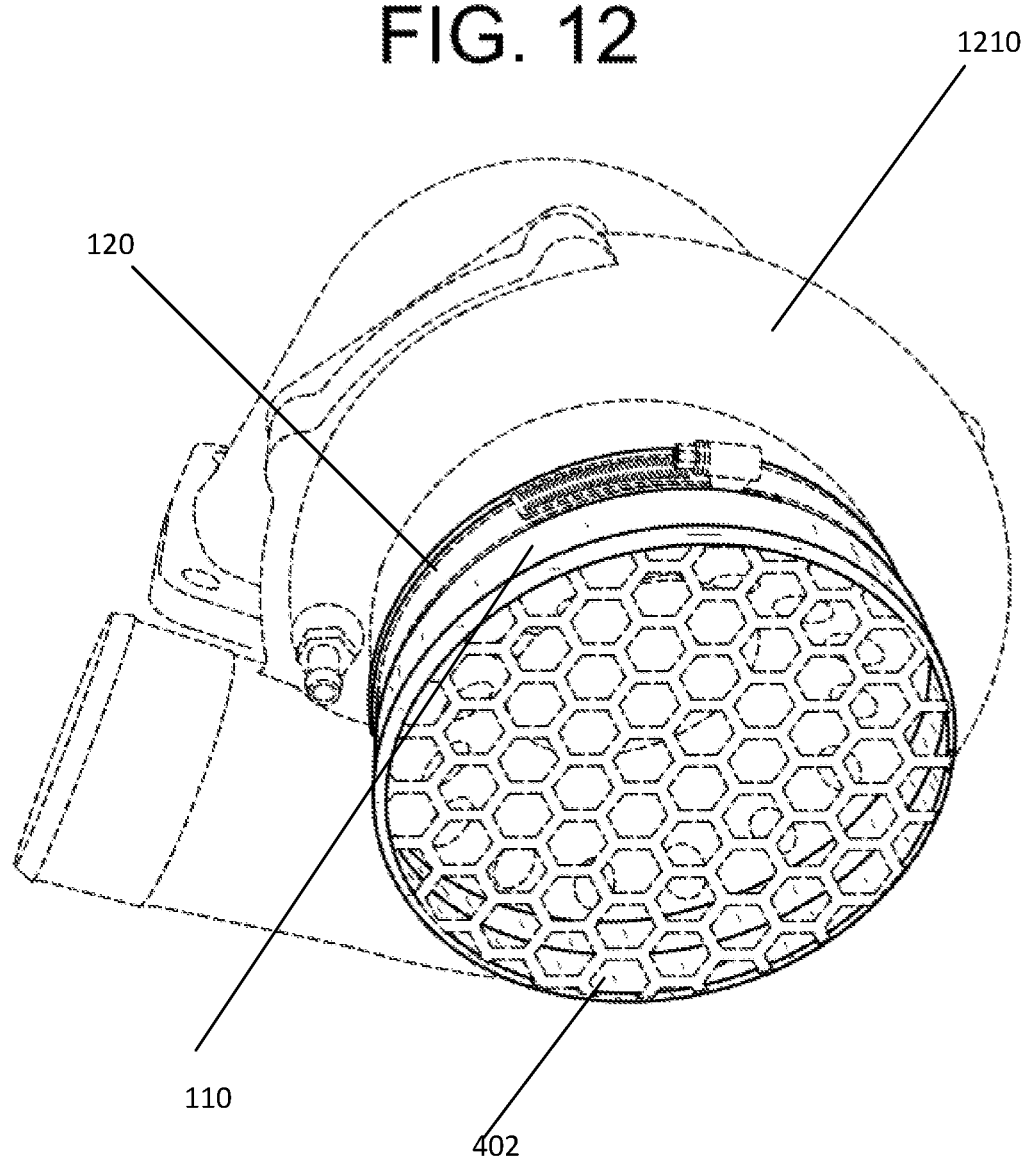
FIG. 12 depicts an intake shield system positioned on a turbocharger, according to an embodiment.

FIG. 12 depicts an embodiment of clamping cylinder 120 and detachable shield 110 being coupled together and the air intake of a turbocharger 1210, according to an embodiment. Elements depicted in FIG. 12 may be described above, and for the sake of brevity a further description of these elements may be omitted.

As depicted in FIG. 12, when clamping cylinder 120 is clamped to the air intake and detachable shield 110, the entirety inner surface of the detachable shield 110 may be positioned in front of and away from the intake of the turbocharger 1210. This may create a distance between the turbocharger and the detachable shield 1210, which may limit the heat transfer between the components, and assist in the removable of detachable shield 1210 from clamping cylinder 120. Furthermore, an inner circumference associated with detachable shield 110 may be larger than an inner circumference associated with the air intake of the turbocharger 1210, which may increase an amount of air that the air intake can receive by creating a Bernoulli effect caused by the change in surface area across the face of detachable shield 110 and the air intake.

Figure 13:
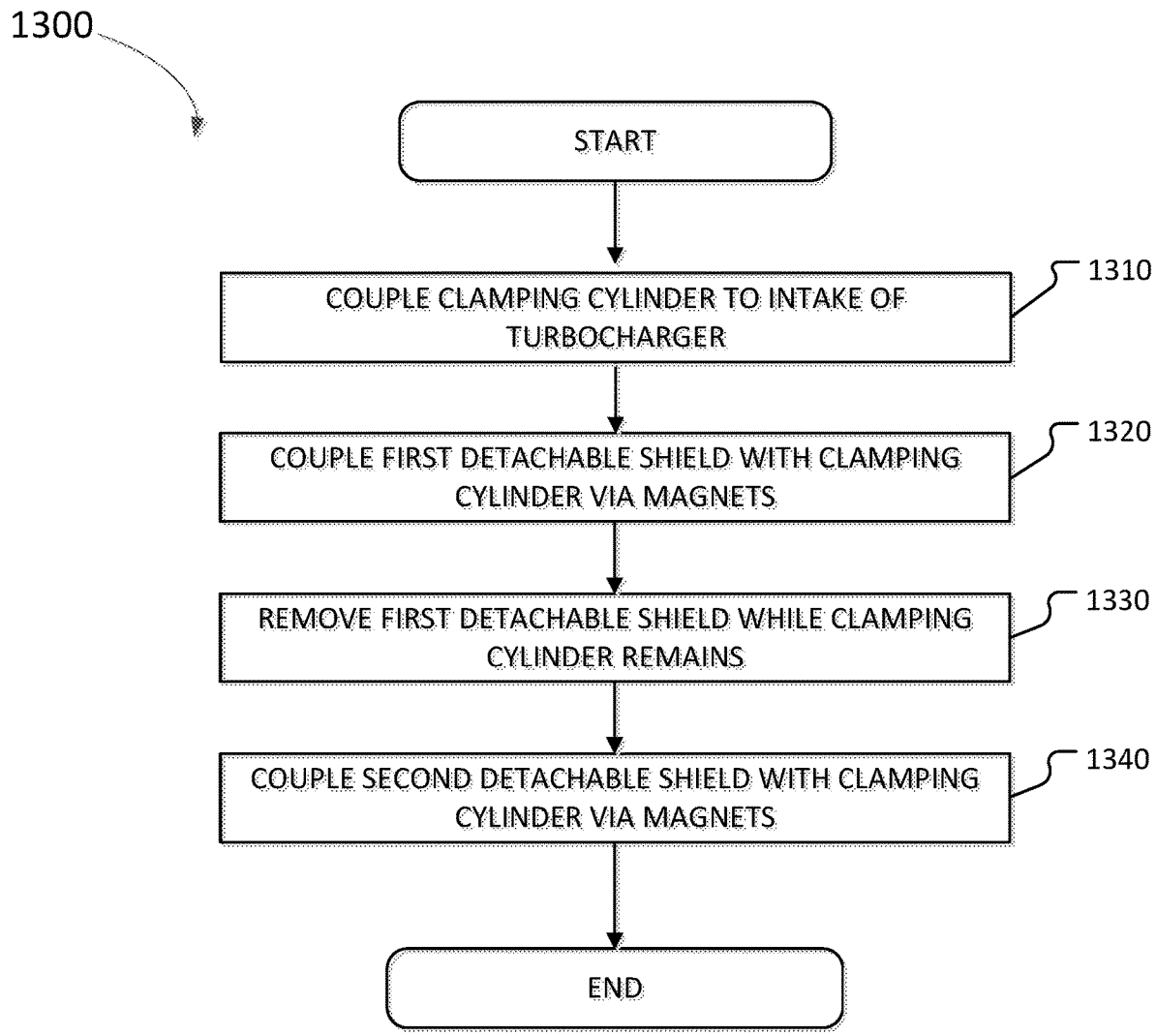
FIG. 13 depicts a method of coupling an intake shield system to a turbocharger, according to an embodiment.

FIG. 13 depicts a method 1300 for coupling an inlet shield system to a intake of a turbocharger, according to an embodiment. The operations of method 1300 presented below are intended to be illustrative. In some embodiments, method 1300 may be accomplished with one or more additional operations not described, and/or without one or more of the operations discussed. Additionally, the order in which the operations of method 1300 are illustrated in FIG. 13 and described below is not intended to be limiting.

At operation 1310, a clamping cylinder may be positioned around an air intake of a turbocharger. A clamp of the clamping cylinder may be tightened to provide a radial force against the outer circumference of the air intake to couple the clamping cylinder to the air intake. A front face of the clamping cylinder may be co-planar or positioned in front of a front face of the air intake.

At operation 1320, a first detachable shield may be coupled to the clamping cylinder via magnets positioned on the front face of the clamping cylinder and a rear face of the first detachable shield. The attraction of the magnets may form forces that are in a same direction of air flow through the clamping cylinder and the first detachable shield. The first shield may have a first guard, wherein the first guard is a mesh pattern that extends across the entirety of a front face of the first detachable shield.

At operation 1330, the first detachable shield may be removed from the clamping cylinder while the clamping cylinder remains fixed on the air intake of the turbocharger.

At operation 1340, a second detachable shield may be coupled to the clamping cylinder magnets positioned on the front face of the clamping cylinder and a rear face of the second detachable shield. The second shield may have a second guard, wherein the second guard is a mesh pattern that is different than the first guard.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

What is claimed is:

1. An inlet shield system comprising:
a clamping cylinder with an inner circumference that is configured to be positioned around an outer circumference of an air intake of a turbocharger, the clamping cylinder having a clamping inner diameter and a clamping outer diameter, wherein first magnets are positioned on an outer face of the clamping cylinder radially between the clamping inner diameter and the clamping outer diameter;
a first detachable shield with an inner face that is configured to be selectively coupled with the outer face of the clamping cylinder, the first detachable shield having a first guard that covers a first face of the first detachable shield, the first guard occupying a first cross-sectional area, the clamping cylinder having a shield inner diameter and a shield outer diameter, wherein second magnets are positioned on an outer face of the detachable shield radially between the shield inner diameter and the shield outer diameter, wherein a force created by the first magnets and the second magnets to couple the clamping cylinder and the first detachable shield extends in a direction in parallel to airflow through the first detachable shield.

2. The inlet shield system of claim 1, wherein the first magnets have a first polarity and the second magnets have a second polarity.

3. The inlet shield of claim 2, wherein the clamping cylinder includes a clamp that is configured to apply a radial force against the outer circumference of the air intake.

4. The inlet shield system of claim 1, further comprising:
an anti-rotation lock formed of castling between depressions and projections positioned on the outer face of the clamping cylinder and the inner face of the first detachable shield, wherein the anti-rotation lock is configured to limit a relative rotation between the clamping cylinder and the first detachable shield.

5. The inlet shield system of claim 1, wherein the outer face of the clamping cylinder is positioned in front of the air intake of the turbocharger.

6. The inlet shield system of claim 1, further comprising:
a second detachable shield that is configured to be coupled with the clamping cylinder, the second detachable shield having a second guard that occupies a second cross-sectional area, the first cross-sectional area and the second cross-sectional area being different amounts.

7. The inlet shield system of claim 6, wherein the clamping cylinder is configured to be secured to the outer circumference of the air intake of the turbocharger when the first detachable shield is decoupled from the clamping cylinder and the second detachable shield is coupled to the clamping cylinder.

8. The inlet shield system of claim 1, wherein a first diameter extending across the first face of the first detachable shield is larger than a second diameter extending across the air intake of the turbocharger.

9. The inlet shield system of claim 1, further comprising:
an insulating layer positioned between the inner face of the first detachable shield and the outer face of the clamping cylinder, wherein the insulating layer is affixed to the inner face of the detachable shield.

10. A method for an inlet shield system for an air intake of a turbocharger, the method comprising:
clamping an inner circumference of a clamping cylinder around an outer circumference of the air intake of the turbocharger, wherein the clamping causes a radial force against the outer circumference of the air intake, the clamping cylinder having a clamping inner diameter and a clamping outer diameter, wherein first magnets are positioned on an outer face of the clamping cylinder radially between the clamping inner diameter and the clamping outer diameter;
selectively coupling an inner face of a first detachable shield with the outer face of the clamping cylinder, the first detachable shield having a first guard that covered a first face of the first detachable shield, the first guard occupying a first cross-sectional area, the clamping cylinder having a shield inner diameter and a shield outer diameter, wherein second magnets are positioned on an outer face of the detachable shield radially between the shield inner diameter and the shield outer diameter, wherein a force created by the first magnets and the second magnets to couple the clamping cylinder and the first detachable shield extends in a direction in parallel to airflow through the first detachable shield wherein first magnets are positioned on the outer face of the clamping cylinder and second magnets are positioned on the inner face of the first detachable shield, wherein the first magnets have a first polarity and the second magnets have a second polarity.

11. The method of claim 10, wherein a force created by the first magnets and the second magnets to couple the cylinder claim and the first detachable shield extends in a direction perpendicular to the radial force of the first clamp.

12. The method of claim 10, further comprising:
forming an anti-rotation lock via castling between depressions and projections positioned on the outer face of the clamping cylinder and the inner face of the first detachable shield, wherein the anti-rotation lock is configured to limit a relative rotation between the clamping cylinder and the first detachable shield.

13. The method of claim 10, wherein the outer face of the clamping cylinder is positioned in front of the air intake of the turbocharger.

14. The method of claim 10, further comprising:
decoupling the first detachable shield from the clamping cylinder;
coupling a second detachable shield that to the clamping cylinder, the second detachable shield has a second guard that occupies a second cross-sectional area, the first cross-sectional area and the second cross-sectional area being different amounts, wherein the clamping cylinder is configured to be secured to the outer circumference of the air intake of the turbocharger when the first detachable shield is decoupled from the clamping cylinder and the second detachable shield is coupled to the clamping cylinder.

* * * * *